C. C. ZABRISKIE.
APPARATUS FOR FACILITATING THE INTERIOR COATING OF SHELLS.
APPLICATION FILED FEB. 12, 1917.
1,231,685.                                         Patented July 3, 1917.
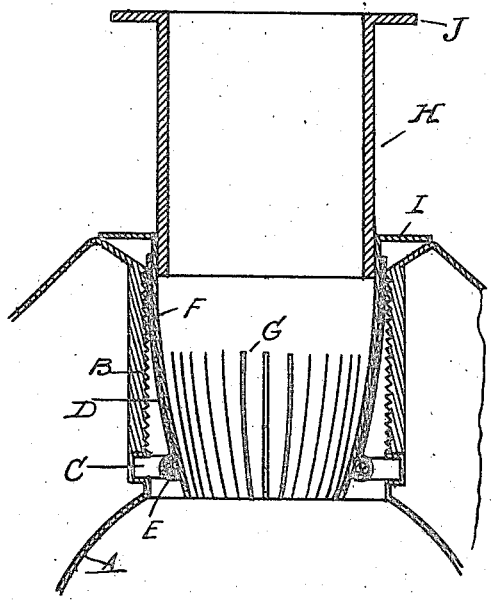
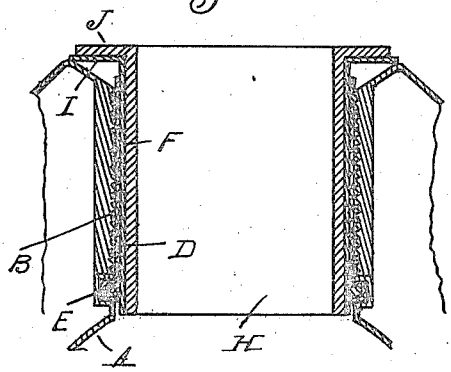
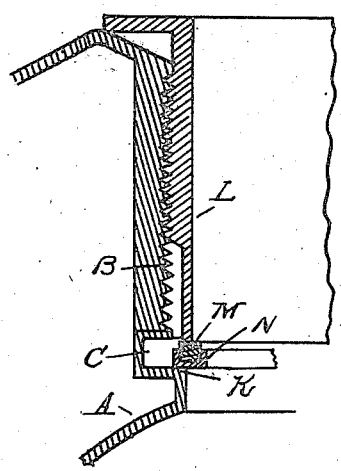
Inventor
Charles C. Zabriskie
By Whittemore, Hulbert & Whittemore
Attorney

UNITED STATES PATENT OFFICE.

CHARLES C. ZABRISKIE, OF DETROIT, MICHIGAN.

APPARATUS FOR FACILITATING THE INTERIOR COATING OF SHELLS.

1,231,685.          Specification of Letters Patent.          Patented July 3, 1917.

Application filed February 12, 1917. Serial No. 148,195.

*To all whom it may concern:*

Be it known that I, CHARLES C. ZABRISKIE, a citizen of the United States of America, residing at Detroit, in the county of Wayne and State of Michigan, have invented certain new and useful Improvements in Apparatus for Facilitating the Interior Coating of Shells, of which the following is a specification, reference being had therein to the accompanying drawings.

The invention relates to the manufacture of explosive shells, and has particular reference to the means employed for varnishing or otherwise coating the interior of the shells without applying said coating to the threaded neck. In the present state of the art it is usual to apply the varnish by pouring a suitable quantity into the interior of the shell, flowing it around the walls and finally draining the surplus quantity out through the neck. As before stated, the neck of the shell is threaded and it has been found extremely difficult to prevent the varnish from entering the threads,—so that a subsequent operation is necessary for clearing the threads. This difficulty I have overcome by providing a protecting bushing having a sealing connection with the inner end of the neck and excluding all of the varnish from the threaded portion thereof.

In the drawings:

Figure 1 is a section showing my apparatus in the act of engagement with a shell;

Fig. 2 is a similar view with the protecting bushing in full engagement;

Fig. 3 is a view similar to Fig. 2 showing a modification.

A is the hollow shell and B is the threaded neck portion thereof, which at its inner end is usually provided with an annular recess C. My improvement comprises a liquid-proof bushing D which is insertible within the neck and at its inner end is provided with a bead or gasket E adapted to engage the annular recess C and form a liquid-tight seal. Preferably the bushing D is formed of rubber or other elastic liquid-proof material, the bead E being formed integral therewith. To hold this member in position it is placed upon a collapsible sleeve F preferably formed of metal and having a series of longitudinal slits G for rendering the same collapsible. There is also provided an inner non-collapsible sleeve member H, which when telescoped within the member F will expand the same and force the bead or gasket E into sealing contact with the recess C. The members F and H are preferably provided with lateral flanges I and J at their outer ends, which bear against the outer surface of the shell and act as stops for limiting the inward movement of the bushing.

With the construction as described in use, the bushing D is mounted upon the collapsible sleeve F and the two members are together inserted within the neck of the shell, as indicated in Fig. 1. This is readily accomplished, as both the bushing and the bead or gasket member E are sufficiently contracted in diameter to be inserted without interference with the threads. The inner sleeve member H is then inserted and forced inward, which will cause the expansion of the slitted sleeve F and the surrounding elastic bushing, forcing the bead or gasket E into sealing contact with the recess. The liquid varnish is then poured into the shell and flowed around the interior surface, after which the shell is placed in inverted position and the surplus liquid is permitted to drain out through the protecting bushing. The gasket E excludes all liquid from access to the threads, while the inner end of the slitted sleeve F which projects beyond the sleeve H acts as a drainage means for conducting away any liquid that might otherwise accumulate at the neck. To remove the bushing the sleeve H is first withdrawn, whereupon the resiliency of the bushing D will cause it to automatically contract in diameter and to collapse the slitted sleeve F, so that the bead E will clear the threads and both bushing and sleeve may be withdrawn.

By use of my improved apparatus as described the necessity of clearing the threads is entirely eliminated and this materially lessens the cost of the operation.

With the modified construction shown in Fig. 3, the shell is provided with a projecting shoulder K below the groove C, which is of a smaller diameter than the inner diameter of the threads. With such a construction a bushing L may be used having a threaded engagement with the threads B, and a gasket M having a metallic supporting ring N is placed in the neck and rests upon the shoulder K. With this construction the ring N will be forced against the shoulder K so as to form a liquid-tight seal, and the resilient compressible gasket M will form a seal with the lower edge of the bushing L. Thus the varnish will be excluded from any access to the threads.

What I claim as my invention is:

1. A protector for a hollow member provided with an entrance orifice forming a neck portion, comprising a bushing insertible in said neck portion, and means for maintaining a sealing joint between the inner end of said bushing and said neck.

2. A protector for a hollow member having an entrance orifice forming a neck portion, comprising a collapsible bushing insertible within said neck portion, and means for expanding said bushing to maintain a liquid seal between the same and said neck at the inner end thereof.

3. A protector for a hollow member having an entrance orifice forming a neck portion, comprising a liquid-proof bushing insertible within said neck portion, and a sleeve telescopically engageable with said bushing to expand the same and to maintain a liquid seal with said neck.

4. A protector for a hollow member having an entrance orifice forming a neck portion, comprising a sleeve longitudinally slitted to be contractible in diameter, a collapsible resilient bushing surrounding said sleeve and insertible therewith into said neck portion, and an inner sleeve member telescopically insertible into said slitted sleeve to expand the same and to press said bushing into sealing contact with said neck.

5. A protector for a hollow member having an entrance aperture forming a neck portion, comprising a collapsible resilient bushing insertible within said neck portion and having a bead or gasket at the inner end thereof, and a sleeve telescopically insertible within said bushing to expand the same and to force said bead or gasket into sealing contact with said neck.

6. A protector for a hollow member having an entrance aperture forming a neck portion, said neck portion being threaded and having an annular recess at the inner end thereof, comprising a collapsible resilient bushing insertible within said neck provided with a bead or gasket at its inner end normally contracted to clear said threads, and a sleeve telescopically insertible within said bushing to expand the same and to force said bead or gasket into sealing contact with said annular recess.

7. A protector for a hollow member having an entrance orifice forming a neck portion, said neck portion being internally threaded and having an annular recess at the inner end thereof, comprising a protecting member insertible within said neck comprising a longitudinally-slitted sleeve, a bushing surrounding said sleeve of resilient liquid-proof material and having a bead or gasket at its inner end normally contractible in diameter to clear said thread, and an inner sleeve member telescopically insertible within said slitted sleeve to expand said bushing and to force the bead or gasket thereof into sealing contact with said annular recess.

In testimony whereof I affix my signature.

CHARLES C. ZABRISKIE.